D. COLE.
ART OR METHOD OF TREATING SLIMES.
APPLICATION FILED APR. 12, 1913.
1,205,326.
Patented Nov. 21, 1916.
3 SHEETS—SHEET 1.
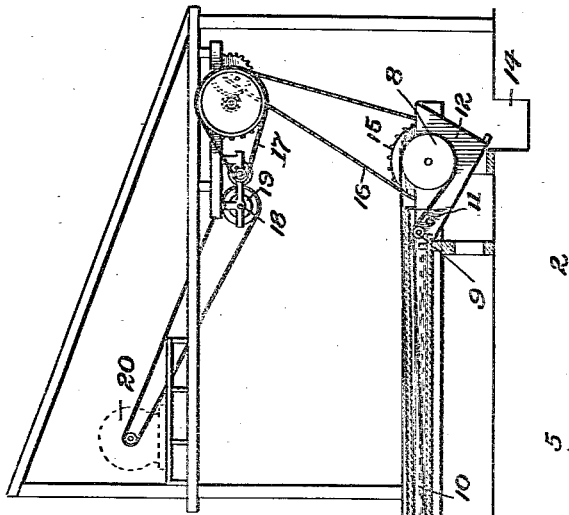
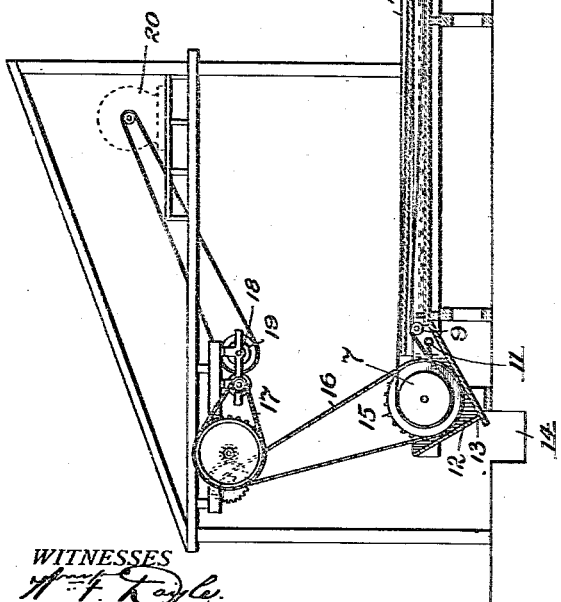
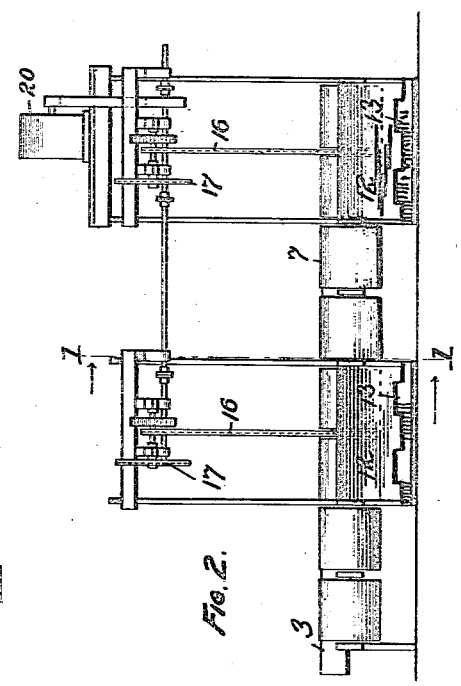
WITNESSES
INVENTOR
David Cole
by Dodge & Sons Attorneys

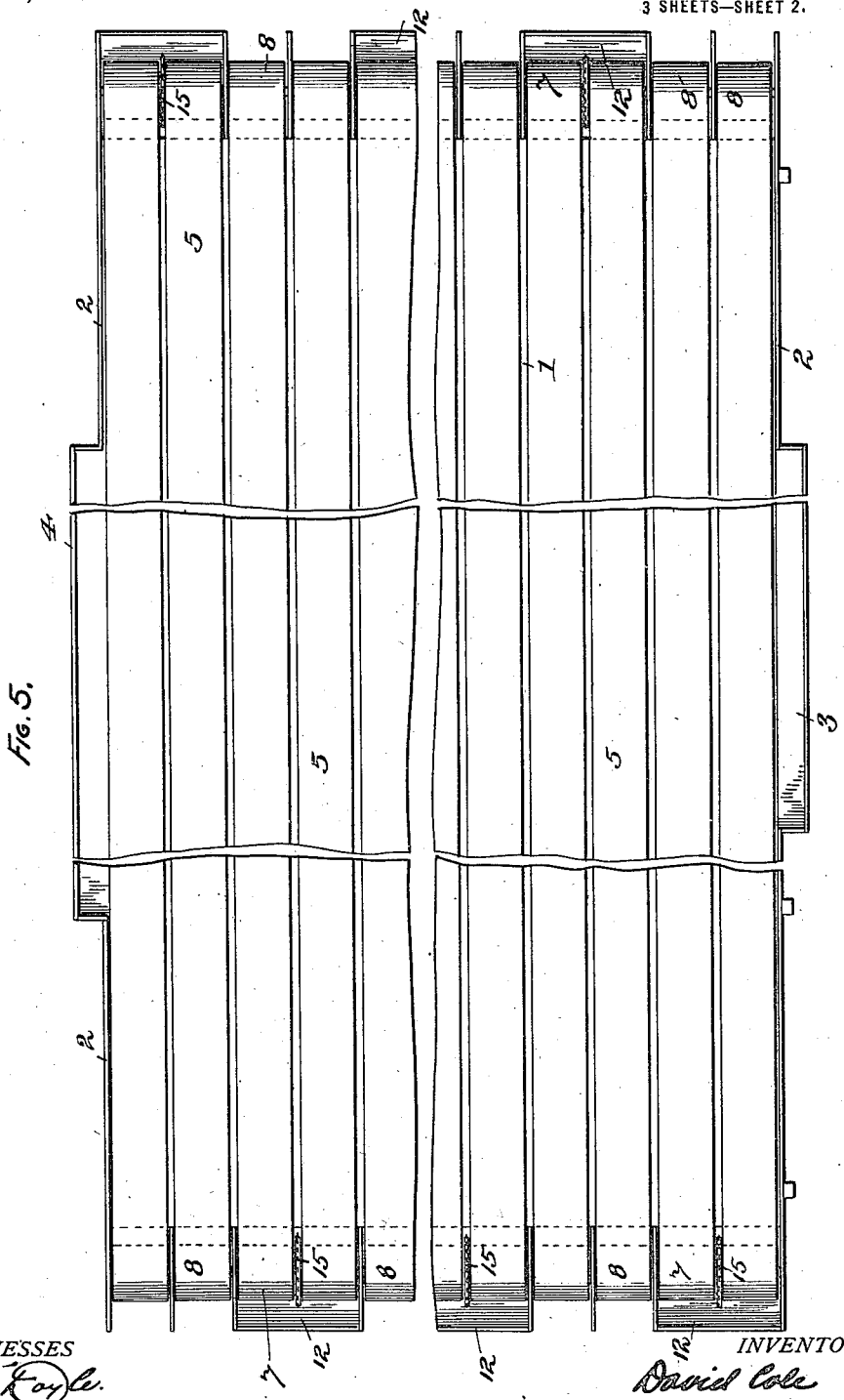

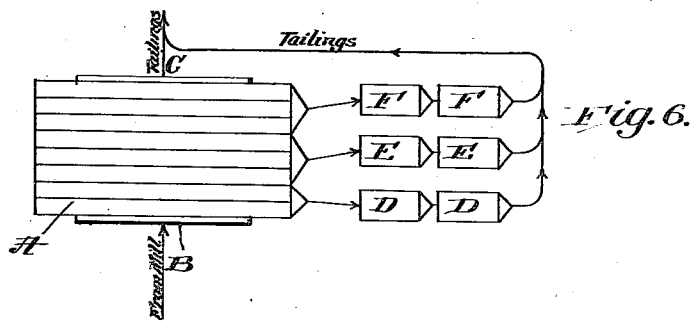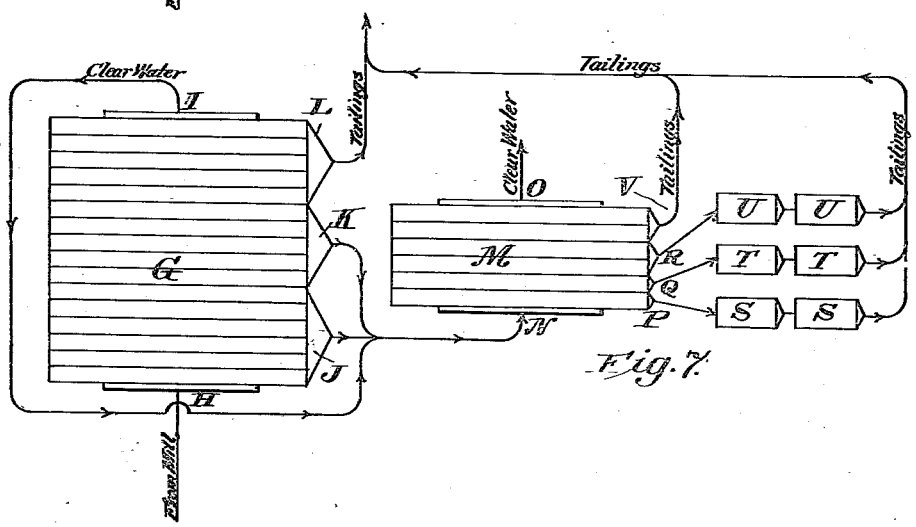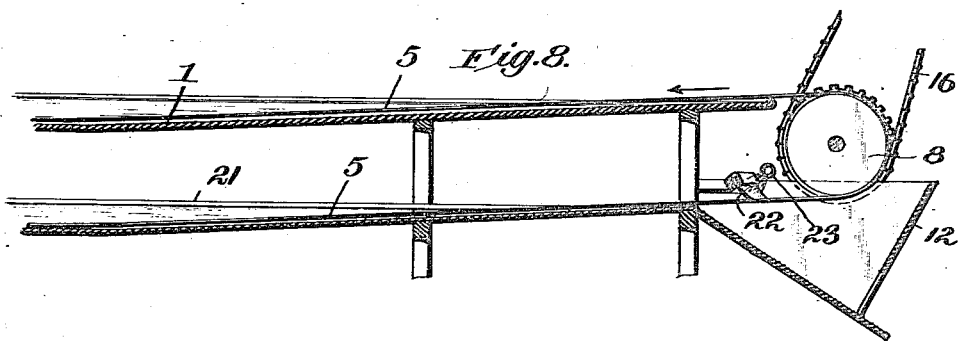

UNITED STATES PATENT OFFICE.

DAVID COLE, OF TUCSON, ARIZONA.

ART OR METHOD OF TREATING SLIMES.

1,205,326.        Specification of Letters Patent.      Patented Nov. 21, 1916.

Application filed April 12, 1913. Serial No. 760,702.

*To all whom it may concern:*

Be it known that I, DAVID COLE, a citizen of the United States, residing at Tucson, in the county of Pima and State of Arizona, have invented certain new and useful Improvements in the Art or Method of Treating Slimes, of which the following is a specification.

This invention relates to an art or method of classifying and concentrating slimes, particularly adapted to the treatment of sulfid copper ores and similar ores.

The apparatus hereinafter described for practising this process forms the subject of a divisional application, Serial Number 16,702, filed March 24, 1915, and hence is not claimed herein.

In order that the general principle involved in the invention may be fully understood I shall outline briefly the nature of the material to be handled, and certain characteristics of its behavior in water.

In treating sulfid copper ores by the method hitherto in general use, the greatest unavoidable losses in metal have occurred in that portion of the rejections known as "slimes." Slimes may generally be defined as a mixture of water and comminuted ore and mineral capable of passing readily a screen having openings twenty-five ten-thousandths (0.0025) of an inch square. Heavy tonnages of such slimes must be handled in all cases in which the metallic elements to be recovered are so disseminated throughout the ore as to require fine grinding. The difficulty in handling such slimes arises from the presence in them of a large percentage of what have come to be known in the art as colloids, as contradistinguished from crystalloids or crystalline metallic sulfids and other generally crystalline metallic compounds. As a general rule the so-called colloids contain a relatively small percentage of metallic values in sulfid form and their presence always greatly hinders the concentration of such values from the crystalline material because of a characteristic flocculent arrangement which the colloids assume almost as soon as the slime solution comes to rest and solids begin to settle.

By a careful series of tests I have determined the characteristic behavior of such slimes during the settling action. When the settling first begins, and before the colloids have had an opportunity to assume their flocculent arrangement, the settling of the crystalline particles is very little impeded by the colloids, and takes place rapidly, so that a small percentage of the crystalloids, generally the larger particles, readily settle to the bottom. As the colloids assume their characteristic flocculent form the flakes begin to arrest and sustain the smaller crystalloid particles, and as the flocculence becomes more pronounced and the flakes settle into closer contact with one another, larger and larger crystalloid particles are arrested. This settling of the flakes takes place slowly, because of the retarded outflow of water from between the flakes, but by the time it has progressed to a point at which the solids form about 7% of the mixture the settling of the crystalloids is greatly impeded and by the time the solids form 10% of the mixture all settling of the crystalloids through the flocculent colloids seems to cease. In all types of cones, spitzkastens and other prior devices used in treating this class of material, much thickening of the solution by settling of the flocculent colloids necessarily takes place prior to the settling out of a large percentage of the crystalloids and as the solution is of considerable depth in these prior devices an unduly large proportion of concentratable crystalloids does not reach the bottom and separate but remains mixed with and goes with the colloids. The tests have further shown that if the slime solution be sufficiently dilute the settling of the crystalloids is practically unimpeded because of the separation of the colloid flakes, thus leaving avenues between them through which the crystalloids may fall, though as the flakes settle a degree of concentration will ultimately be reached sufficient to obstruct the complete precipitation of the crystalloids.

The above considerations have suggested to me the impracticability of successfully concentrating slimes containing colloids by the present practice of thickening the slime prior to feeding it to slimers and the like; and have suggested the desirability of effecting a preliminary separation and removal of the colloids by taking advantage of the early portion of the settling cycle of the slime in the presence of an excess of water in very shallow vessels.

If the above principles are to be availed of it is desirable that the path of the settling particles may be short so that the crystalline particles may reach the point of removal before the colloid flakes have seized them in the rapidly condensing mass. It is also desirable that the colloid mass be removed separately thus leaving a comparatively large percentage of clarified water to be again used as such.

I have successfully carried out my process by making use of a large settling tank approximately six inches deep to which I feed a dilute slime mixture, for example one containing about 5% of combined crystalloid and colloid solids. The mixture is fed in at one side of the tank, flows slowly across the tank and is discharged over a wide shallow overflow at the opposite side of the tank. The movement of the slime across the tank is characterized generally by a "whole flow" as contradistinguished from a "surface flow."

The shallowness of the tank and the dilute nature of the solution cause a settling out of the crystalloids early in the path of the solution across the tank, the colloids being carried farther across the tank because of their greater tendency to remain in suspension.

Various slightly different methods of availing of the broad characteristic principle of my invention have been used by me, the most satisfactory involving a repetition of the settling process to secure a better separation and incidentally to recover a proportion of the water used in the process.

The simplest method is of course to make use of a relatively narrow tank with a correspondingly small number of belts, sufficient to include the zone of settling of the crystalloids and usually a limited portion of the zone in which mixed crystalloids and colloids are precipitated. The bulk of the colloids thus overflow from the tank as tailings with the water, the precipitated material being the concentrates. In order to save part of the water it is preferable however to make use of a much wider tank having a correspondingly larger number of belts, the tank being so designed that all the solids both crystalloid and colloid are successively precipitated and clear water is discharged at the overflow. The belts will then lie in three zones (1) that in which practically only crystalloids are precipitated, (2) that in which substantial proportions of both crystalloids and colloids are precipitated, and (3) that in which practically only colloids are precipitated. The different classes of material are thus removed from the tank by three different sets of belts, and may then be individually treated.

To secure a practical elimination of colloids the water discharged at the overflow is fed together with the precipitates from zones 1 and 2 to a second and narrower tank. Because of the dilute nature of the solution, complete precipitation takes place in this tank and clear water overflows, and there is a relatively well defined line between the zones of precipitation of colloids and of crystalloids, which are consequently carried out by different sets of belts.

The crystalloid material freed of colloids by any of the above methods is readily treated with a better recovery of values by concentrating methods well known in the art. If the colloid material contains mineral values it may be subjected to appropriate subsequent treatment to recover them, such as flotation processes, or chemical leaching.

I shall now describe my method or process in detail with reference to the device which has proved successful as a means of performing it. I recognize, however, that other devices are available to effect the carrying out of the process and do not limit myself to this particular device or to the exact arrangements shown.

In the accompanying drawings: Figure 1 is a section through a settling tank embodying my invention, the plane of section being taken on the line 1—1 of Fig. 2; Fig. 2 is an elevation of the right end of the same looking from the right as viewed in Fig. 1; Fig. 3 is an enlarged fragmentary view of a portion of Fig. 1, showing the position of the belt on the bottom of the settling tank, and in the return basin; Fig. 4 is a view of the underside of a belt which I prefer to use in my device for the first two belts counted from the supply side; Fig. 5 is a plan view of the tank showing the general arrangement of the belts, location of the supply and overflow, etc.; Fig. 6 is a flow diagram of the simplest method of practising my invention; Fig. 7 is a flow diagram of the preferred method of practising my invention; and Fig. 8 is a fragmentary vertical section of a modified form of settling tank.

Referring to the drawings, it will be noted that the settling tank proper consists of a bottom or floor 1 flat at its middle portion and gradually sloping upward toward the ends. The sides of the tank 2 are provided with the supply or inlet chamber or enlargement 3 and a side overflow 4 located at a slight distance below the top of the side walls 2 in order that material may flow from the tank in a wide thin sheet. The arrangement of the sides 2, overflow 4 and of the bottom 1 are such that the maximum depth of material in the tank is approximately six inches although this dimension may be departed from according to the character of the material to be handled, and may be more or less.

Running longitudinally in the tank are a plurality of rubber-coated belts 5 the lower sides of the first two belts in the series being preferably formed with the V-shaped ribs or flights 6. The function of these flights is to move toward the edge of the belt any relatively coarse material which may find its way beneath the same so that the belts will not be lifted away from the bottom of the tank by the accumulation of material beneath them. The belts are arranged in pairs, successive pairs being driven in opposite directions. Each belt runs at one end on a live drum or pulley 7 and at the opposite end on an idle drum or pulley 8, the return run of the belt being guided by snub pulleys 9 through a shallow water basin 10 designed to clean and prevent undue wear in the belts. The spray pipes 11 are provided to wash material off the belts as they leave the live pulleys so as to prevent the belts from carrying any solid material on the return run. The live pulleys 7 are mounted in the hoppers or boxes 12 adapted to receive any solid material conveyed out of the tank by the belts, and discharge it through openings 13 into suitable troughs or launders indicated at 14. The arrangement of these launders varies with the particular case as is obvious. Each pair of adjacent live pulleys is driven by a sprocket 15 interposed between them. This is connected by means of a chain 16 to a suitable speed reducing train 17 shown as consisting of gears and sprockets. It might take any of many well known forms. A reducing train 17 is preferably provided for each sprocket 15, or in other words for each pair of belts if necessary, and each reducing train receives its power from one of the line shafts 18 through suitable individual change speed devices indicated at 19. The line shafts are driven by motors such as the electric motors indicated by dotted lines at 20. The speed of movement of each pair of belts may be subjected to individual regulation, by means of the change speed devices 19.

The purpose of arranging the alternate pairs of belts to run in opposite directions is to neutralize the effect of the moving belts upon the flow of material across the tank. Obviously they might all be run in the same direction but I prefer the arrangement described. Although the dimensions of the tank and belts are subject to considerable variation I have secured very satisfactory results with a tank in which the belts travel about 35 feet under the surface of material in the tank, the belts moving at a speed of about 35 feet per minute. The width of each pair of belts in this device is approximately 50 inches and the number of pairs of belts used, and the depth of the tank, are dependent upon the nature of the material to be handled and the time required to complete the cycle desired and the method of treatment adopted as already suggested.

The dimensions given are only illustrative and I do not limit myself to them.

Where it is desirable to do so I construct these machines so that the return run of belt 5 passes through a second tank 21 underneath the first tank 1, and substantially identical therewith in form and function. See Fig. 8. Thus a double machine is formed without increase in floor space and with only moderate increase in height. However, it is necessary in the case of the lower belt to provide a squeegee 22 set upon the belt and lubricated with water from a spray pipe 23 for the purpose of removing the material brought up to this point by the belt. This squeegee effect is produced by applying a piece of thin rubber or a piece of rubber belting upon the smooth surface of the belt at an angle with its travel so that the material carried on its surface is caused to flow off to one side of the belt and be deposited in the hopper 12 and be adapted to pass out of the spout 13 in the same manner and condition as the product produced on the belt emerging from the upper basin. Where a large tonnage is to be handled this arrangement economizes space and is desirable.

As already suggested the principle involved in the process and the apparatus illustrated for practising it, may be utilized in a number of relations differing in detail but fundamentally similar.

In Fig. 6 I illustrate diagrammatically a single tank A having eight belts. The feed from the mill enters at B. The tailings (colloids) overflow at C with the water. The concentrates (crystalloids) are precipitated and are carried out by the belts (here assumed all to move in the same direction for ease in making the diagram). The concentrates from different groups of belts are fed to different clean up machines D, E, F, each of which may, if desired, be particularly adapted to the class of material precipitated on the corresponding belts in the tank.

In Fig. 7 I illustrate diagrammatically a sixteen belt tank G. The feed from the mill enters at H. Clear water overflows at I. The first six belts discharge crystalloids at J; the next five belts discharge crystalloids and colloids in varying proportions at K; and the last five belts discharge colloid tailings at L. The water overflowing at I and the solid material from J and K are fed to a six belt tank M and N. Clear water overflows at O and may be used in any desired manner. The first belt discharges at P, the second at Q and the third and fourth at R to corresponding clean-up machines S, T and U; the fifth and sixth belts discharge colloid tailings at V.

The material fed to tanks A and G contains about 5% of solids or less in the case of very fine materials. The material fed to tank M is usually much more dilute, and this tank effects a very complete removal of the colloids because of such dilution and because of the comparatively small amount of colloid material present.

As a general rule belts intended to withdraw precipitated colloids must be run slower than is necessary for similar belts for removing crystalloids to avoid eddies which otherwise would keep the colloids in suspension.

Generally stated the process may be said to consist of separating the colloids and crystalloids by taking advantage of the early portion of the settling cycle in a diluted slime solution or in other words precipitating a portion of the crystalloids before the colloids can assume their flocculent arrangement, precipitating the balance of the crystalloids through the flocculent colloids while the same are sufficiently separated as not to obstruct the descent of the crystalloids, and then removing the colloids before they can settle in any large amount.

Having thus described the invention, what I claim is:—

1. The art of separating crystalloids from slimes which tend to become flocculent, which consists in diluting the slime mixture sufficiently to insure the existence of spaces between the flakes for the passage of the crystalloid particles, allowing said particles to settle through said spaces and removing said flakes while in suspension from the settling zone and prior to the precipitation of any substantial portion thereof.

2. The art of separating crystalloids from slimes which tend to become flocculent, which consists in diluting the slime mixture sufficiently to insure the existence of spaces between the flakes for the passage of the crystalloid particles, holding said diluted mixture in a shallow depth or layer and allowing said particles to settle through said spaces, whereby interference by the flakes with the settling of the particles is minimized, and removing the flakes while in suspension from the settling zone and prior to the precipitation of any substantial portion thereof.

3. The art of separating crystalloids from slimes which tend to become flocculent, which consists in diluting the slime mixture sufficiently to insure the existence of spaces between the flakes for the passage of the crystalloid particles, and producing a slow whole flow of the diluted mixture in a shallow stream permitting the settling of said particles through said flakes while carrying substantially all said flakes in suspension beyond the zone of precipitation of said particles.

4. The art of separating crystalloids from slimes which tend to become flocculent, which consists in diluting the slime mixture sufficiently to insure the existence of spaces between the forming and settling flakes for the passage of the crystalloid particles, allowing said particles to settle through said mixture prior to and during the formation of said flakes and removing said flakes while in suspension from the settling zone and prior to the precipitation of any substantial portion thereof.

5. The art of separating crystalloids from slimes which tend to become flocculent, which consists in diluting the slime mixture sufficiently to insure the existence of spaces between the forming and settling flakes for the passage of the crystalloid particles, holding said diluted mixture in a shallow depth or layer and allowing said particles to settle through said mixture prior to and during the formation of said flakes, and removing said flakes while in suspension from the settling zone and prior to the precipitation of any substantial portion thereof.

6. The art of separating crystalloids from slimes which tend to become flocculent, which consists in diluting the slime mixture sufficiently to insure the existence of spaces between the forming and settling flakes for the passage of the crystalloid particles, and producing a slow whole flow of the diluted mixture in a shallow stream permitting the settling of said particles through said mixture prior to and during the formation of said flakes while carrying substantially all said flakes in suspension beyond the zone of precipitation of said particles.

7. The method of separating crystalloids from colloids in slime solutions which consists in producing a free settling condition by dilution of the slimes with water; then causing a continuous substantially horizontal flow of such mixture in a shallow and substantially uniform stream across the bottom of a tank whereby the crystalloids and the colloids are successively deposited in the flow across the tank; removing from the tank the precipitates containing substantial proportions of crystalloids; and then finally greatly diluting said precipitates with water and subjecting this more diluted mixture to a repetition of the treatment above outlined in a second and similar tank to remove any colloids not removed in the first treatment.

8. The method of separating crystalloids from colloids in slime solutions which consists in producing a free settling condition by dilution of the slimes with water; then causing a continuous substantially horizontal flow of such mixture in a shallow and substantially uniform stream across the bottom of a tank whereby the crystalloids and the colloids are successively deposited in the flow across the tank and clear water is discharged therefrom; removing from the tank precipitates containing substantial proportions of crystalloids; mixing said precipitates with the water discharged from the tank, whereby a greatly diluted mixture is formed; and finally subjecting this mixture to a second and similar settling treatment in a second and similar tank to remove colloids not removed by the first treatment.

In testimony whereof I have signed my name to this specification in the presence of two subscribing witnesses.

DAVID COLE.

Witnesses:
L. T. PAYNE,
W. J. LANSING.